United States Patent [19]
Nakano

[11] Patent Number: 5,708,890
[45] Date of Patent: Jan. 13, 1998

[54] TRIPOD

[75] Inventor: Shingo Nakano, Tokyo, Japan

[73] Assignee: Canon Kabushiki Kaisha, Tokyo, Japan

[21] Appl. No.: 734,735

[22] Filed: Oct. 21, 1996

Related U.S. Application Data

[63] Continuation of Ser. No. 279,807, Jul. 25, 1994, abandoned.

[30]  Foreign Application Priority Data

Jul. 30, 1993 [JP] Japan ................................. 5-206939

[51] Int. Cl.$^6$ ............................................. G03B 29/00
[52] U.S. Cl. .................... 396/428; 396/419; 248/187.1; 248/166
[58] Field of Search ........................ 352/243; 396/419, 396/424, 427–8; 248/187, 431–439, 163.2, 166, 168–171

[56]  References Cited

U.S. PATENT DOCUMENTS

| | | | |
|---|---|---|---|
| 4,648,698 | 3/1987 | Iwasaki | 354/293 |
| 5,043,750 | 8/1991 | Yamaguchi | 354/81 |
| 5,081,478 | 1/1992 | Hayashida et al. | 396/419 |
| 5,365,293 | 11/1994 | Nakatani | 396/419 |
| 5,390,885 | 2/1995 | Shen | 354/81 |

*Primary Examiner*—Safet Metjahic
*Assistant Examiner*—Michael Dalakis
*Attorney, Agent, or Firm*—Robin, Blecker, Daley & Driscoll

[57]  ABSTRACT

A tripod applicable to an optical apparatus having a center of gravity the position of which is separate from a position in which the tripod is to be mounted, a supporting portion for supporting a plurality of leg portions is arranged to be movable from a first position to a second position closer to the position of a center of gravity of the optical apparatus mounted to the tripod than the first position.

13 Claims, 3 Drawing Sheets

5,708,890

1

TRIPOD

This is a continuation application under CFR 1.62 of prior application Ser. No. 08/279,807 filed on Jul. 25, 1994, now abandoned.

BACKGROUND OF THE INVENTION

1. Field of the Invention

The present invention relates to a tripod which can be incorporated into or removably attachable to a camera.

2. Description of the Related Art

In a conventional type of small tripod which can be incorporated into or removably attachable to a camera, such as that disclosed in U.S. Pat. No. 4,648,698, a tripod portion 2 is turnably supported on one side of a panhead 1, as shown in FIG. 4, so that the tripod portion 2 can be accommodated in a telescopically reduced state under the bottom of the panhead 1. When the tripod is to be used together with a camera, the tripod portion 2 supported on the panhead 1 connected to the bottom of a camera body 3 is turned to open as shown in FIG. 5, thereby opening three legs.

SUMMARY OF THE INVENTION

One object of the present invention is to expand the range of applications of a tripod.

To achieve the above object, in accordance with one aspect of the present invention, there is provided a tripod in which a supporting portion for supporting a plurality of leg portions is arranged to be movable from a first position to a second position closer to the position of a center of gravity of an optical apparatus mounted to the tripod than the first position.

To achieve the above object, in accordance with another aspect of the present invention, there is provided a tripod in which a supporting portion for supporting a plurality of leg portions is rotatably arranged and is capable of displacing its position relative to a mounting portion to which an optical apparatus is mounted.

Another object of the present invention is to provide a tripod capable of aiding in holding an optical apparatus mounted to the tripod.

To achieve the above object, in accordance with another aspect of the present invention, there is provided a tripod including a grip portion.

The above and other objects, features and advantages of the present invention will become apparent from the following detailed description of a preferred embodiment of the present invention, taken in conjunction with the accompanying drawings.

DETAILED DESCRIPTION OF THE PREFERRED EMBODIMENT

An embodiment of the present invention will be described below with reference to FIGS. 1 through 3.

Figure 1:
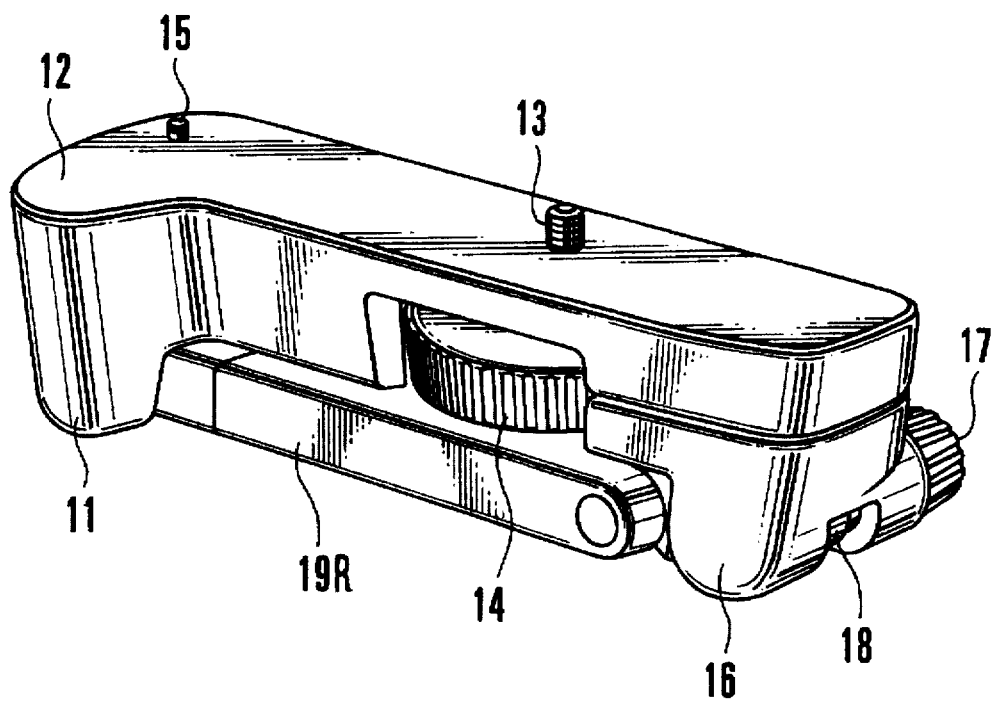
FIG. 1 is a diagrammatic perspective view showing an embodiment of a tripod according to the present invention, the tripod being provided on an extension grip removably attachable to a camera.
Figure 2:
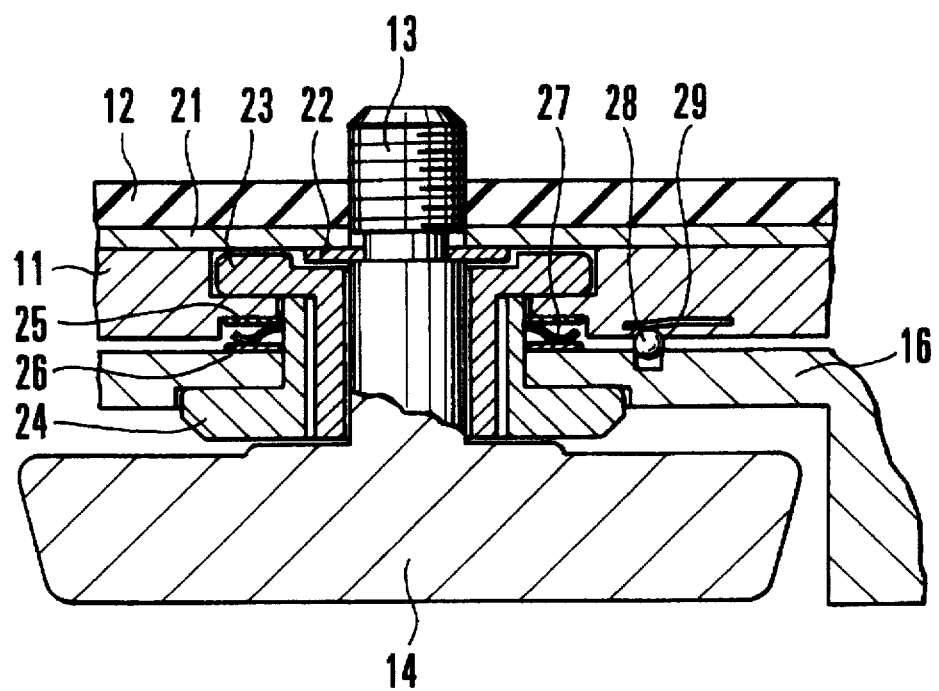
FIG. 2 is a diagrammatic, cross-sectional view showing on an enlarged scale the essential portion of the tripod shown in FIG. 1.
Figure 3:
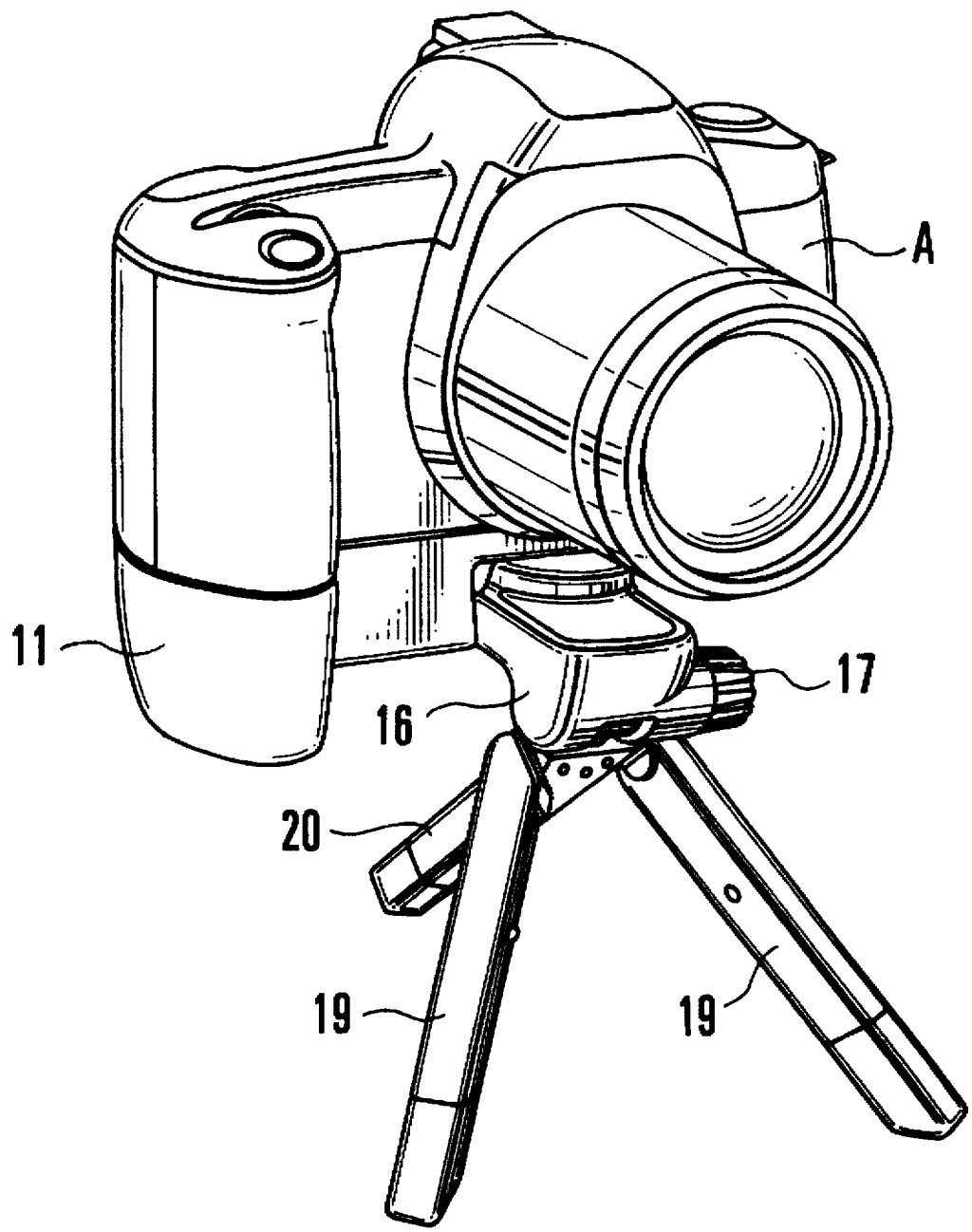
FIG. 3 is a diagrammatic perspective view showing a state in which the tripod shown in FIG. 1 is connected to a camera.
Figure 4:
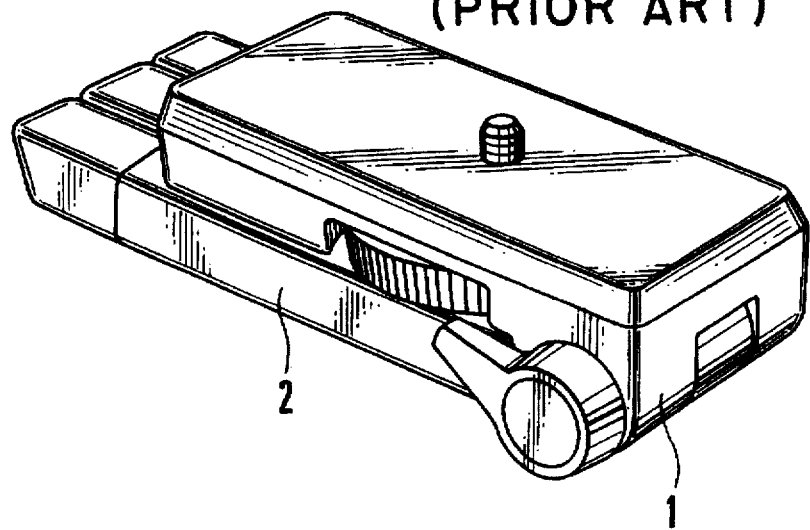
FIG. 4 is a diagrammatic perspective view of a conventional tripod of small size which can be incorporated into or removably attachable to a camera.
Figure 5:
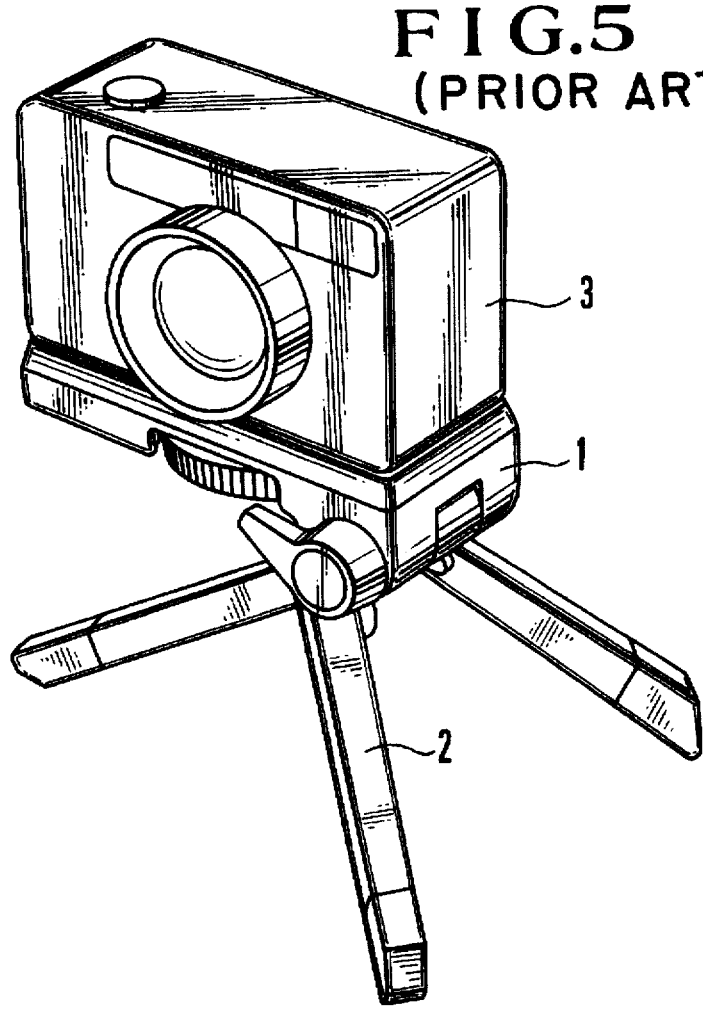
FIG. 5 is a diagrammatic perspective view showing a state in which the tripod shown in FIG. 1 is connected to a camera.

FIG. 1 is a diagrammatic perspective view of the embodiment of the present invention, FIG. 2 is a cross-sectional view of the essential portion of the embodiment, and FIG. 3 is a diagrammatic perspective view of the embodiment which is used together with a camera.

The embodiment shown in FIG. 1 includes an extension grip body 11, a pad 12 attached to the top face of the extension grip body 11, a tripod screw 13 for connecting the extension grip body 11 to a camera body A, a fastening ring 14 formed integrally with the tripod screw 13 in such a manner as to be rotatable together with the tripod screw 13, a positioning pin 15 projected from the top face of the extension grip body 11 for determining a positional relationship between the extension grip body 11 and the camera body A, and a rotatable panhead 16 provided with three legs and other associated elements, the rotatable panhead 16 being provided on a bottom portion of the extension grip body 11 on one side thereof.

The shown embodiment also includes a lock lever 17 provided on the rotatable panhead 16 for tilting or locking the legs which will be described later, a known, flexible joint (ball and socket joint) 18 provided in the rotatable panhead 16 for realizing a tilting function, and three legs, right leg 19R, left leg 19L and central leg 20 (which is shown in FIG. 3), pivotally secured to the rotatable panhead 16.

The essential portion shown in FIG. 2 includes a steel plate 21 provided on the internal side of the pad 12 for reinforcing the strength of the extension grip body 11, an E ring 22 for preventing the tripod screw 13 from coming off from the extension grip body 11, and fastening screws 23 and 24 for connecting the extension grip body 11 and the rotatable panhead 16 to each other. The fastening screws 23 and 24 are provided coaxially to the tripod screw 13 and engaged with each other. The shown essential portion also includes washers 25 and 26 provided between the extension grip body 11 and the rotatable panhead 16, a wave-shaped washer 27 fitted onto the fastening screw 24 and serving to produce a friction between the rotatable panhead 16 and the extension grip body 11 via the washers 25 and 26, and a ball 28 disposed to determine its position by dropping into a click groove formed in the rotatable panhead 16, the ball 28 being pressed by a click spring 29 which serves to give a click force to the rotatable panhead 16.

In the operation of the present embodiment having the above-described arrangement, if the fastening ring 14 is made to rotate with the right leg 19R and left leg 19L and the central leg 20 being accommodated in the telescopically reduced state shown in FIG. 1, the extension grip body 11 and the camera body A are connected to each other by means of the positioning pin 15 and the tripod screw 13.

Then, if the rotatable panhead 16 is made to rotate about the tripod screw 13, the rotatable panhead 16 moves toward a lens side. At this time, the ball 28, which has been caught in the click groove formed in the rotatable panhead 16, comes off from the click groove to produce a click force. Upon completion of the rotation of the rotatable panhead 16 toward the lens side, the ball 28 again drops into the click groove to determine a set position and simultaneously produce a click force. During the rotation of the rotatable panhead 16, the wave-shaped washer 27 produces a friction between the rotatable panhead 16 and the extension grip body 11 via the washers 25 and 26.

After the completion of the rotation of the rotatable panhead 16, when the right leg 19R and left leg 19L and the central leg 20 are telescopically extended and the lock lever 17 is turned in its counterclockwise direction, the flexible joint 18 is placed into its free state. Then, the inclination of the camera body A is determined, and when the lock lever 17 is locked by being turned in its clockwise direction, the state shown in FIG. 3 is obtained.

As described hereinabove, a tripod of small size provided on an extension grip is supported by a panhead which is movable between a first position in which the tripod can be accommodated integrally with a camera body and a second position in which the tripod can stably support a camera below a photographic lens. Accordingly, even if this tripod of small size is employed with, for example, a single-lens reflex camera having the center of gravity the position of which is offset toward a lens side from the position in which the tripod is mounted, it is possible to execute photography with the camera stably supported by the tripod.

What is claimed is:

1. A tripod, comprising:
   a) a plurality of leg portions;
   b) a mount surface attachable to an optical apparatus; and
   c) a joint portion for providing jointing of all of said plurality of leg portions and movable between a first position when the tripod is used and a second position when the tripod is stored,
   wherein said first position is more towards a lens side of the optical apparatus than said second position in an optical axis direction of the optical apparatus.

2. A tripod according to claim 1, wherein said joint portion has an adjusting mechanism for adjusting an angle of the optical apparatus to be mounted.

3. A tripod according to claim 1, wherein said plurality of leg portions are all storable on a plane parallel to said mount surface.

4. A camera, comprising:
   a) a camera body;
   b) a plurality of leg portions; and
   c) a joint portion for providing jointing of all of said plurality of leg portions and movable between a first position when a tripod is used and a second position when the tripod is stored,
   wherein said first position is more towards a lens side of the camera than the second position in an optical axis direction of the camera.

5. A camera according to claim 4, wherein said joint portion has an adjusting mechanism for adjusting an angle of said camera body.

6. A camera according to claim 4, wherein all of said plurality of leg portions are storable on a planar plane parallel to a mount surface attached to the camera body.

7. A tripod, comprising:
   a) a plurality of leg portions;
   b) a mount surface attachable to an optical apparatus;
   c) a grip portion for improving holding of the optical apparatus attached to said mount surface; and
   d) a joint portion for providing jointing of all of said plurality of leg portions and movable between a first position when the tripod is used and a second position when the tripod is stored,
   wherein said first position is more towards a lens side of the optical apparatus than said second position in an optical axis direction of the optical apparatus.

8. A tripod according to claim 7, wherein said joint portion has an adjusting mechanism for adjusting an angle of the optical apparatus to be mounted.

9. A tripod according to claim 7, wherein said plurality of leg portions are all storable on a plane parallel to said mount surface under said second state.

10. A tripod according to claim 7, wherein a fixture member for fixing the optical apparatus is provided on said mount surface, and said joint portion is rotatable around said fixture member.

11. A tripod according to claim 1, wherein said mount surface has an almost same shape as a bottom of said optical apparatus.

12. A tripod according to claim 10, wherein said mount surface has a protrusion for positioning said optical apparatus.

13. A tripod, comprising:
   a) a plurality of leg portions;
   b) a mount surface on which a bottom of a camera is mounted;
   c) a fixing screw provided on said mount surface to engage with a female screw portion provided on the bottom of said camera; and
   d) a joint portion where all of said plurality of leg portions are jointed said joint portion is rotatable around said fixing screw wherein said joint portion is drawn out to a lens side in the optical axis direction of the camera for using the tripod by said rotation.

* * * * *